Nov. 4, 1924.　　　　　　E. E. WINKLEY　　　　　1,513,779
STOCK CUTTING MACHINE
Original Filed May 26, 1920　　3 Sheets-Sheet 2
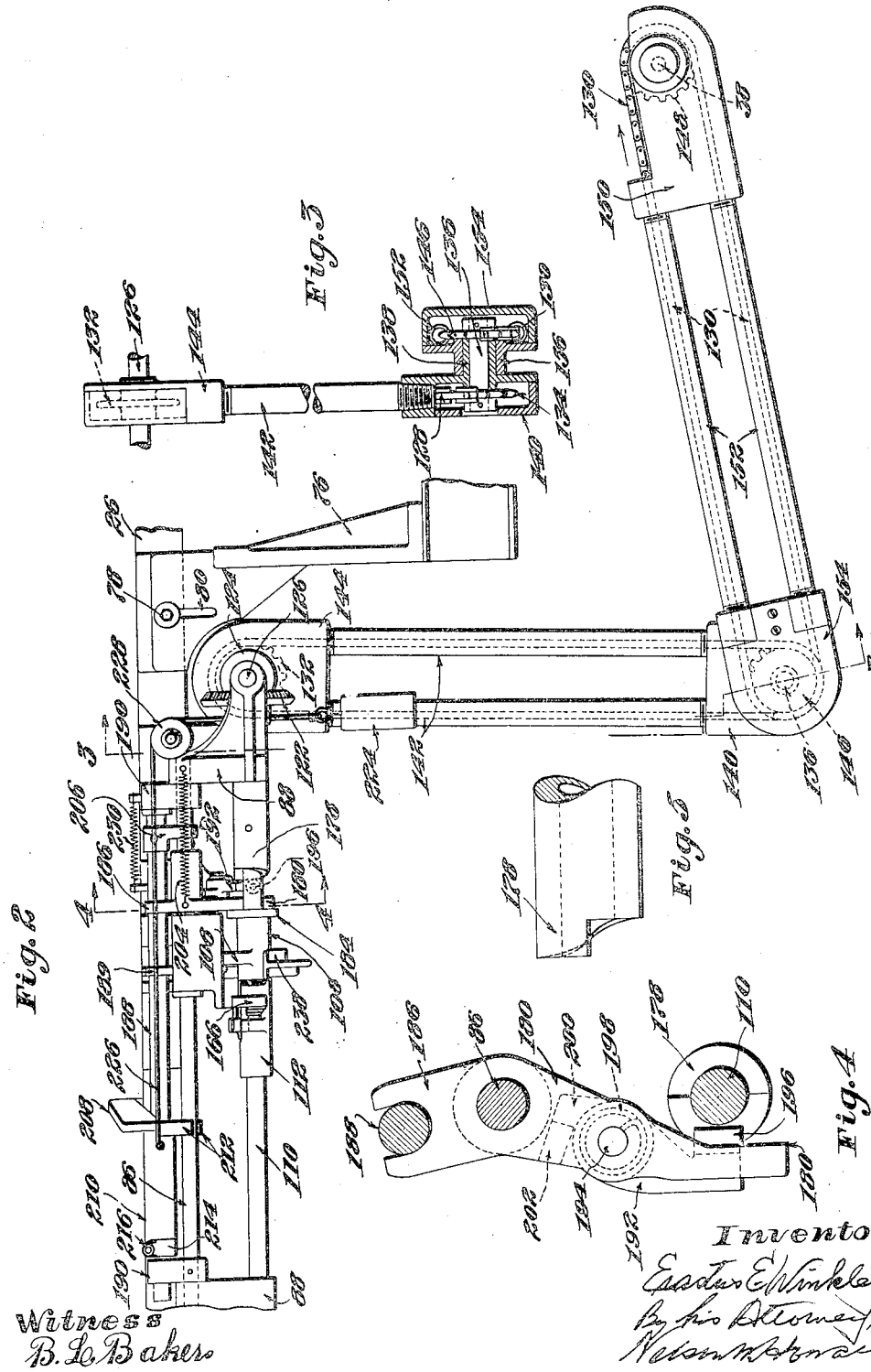
Witness
B. L. Baker
Inventor
Erastus E. Winkley
By his Attorney

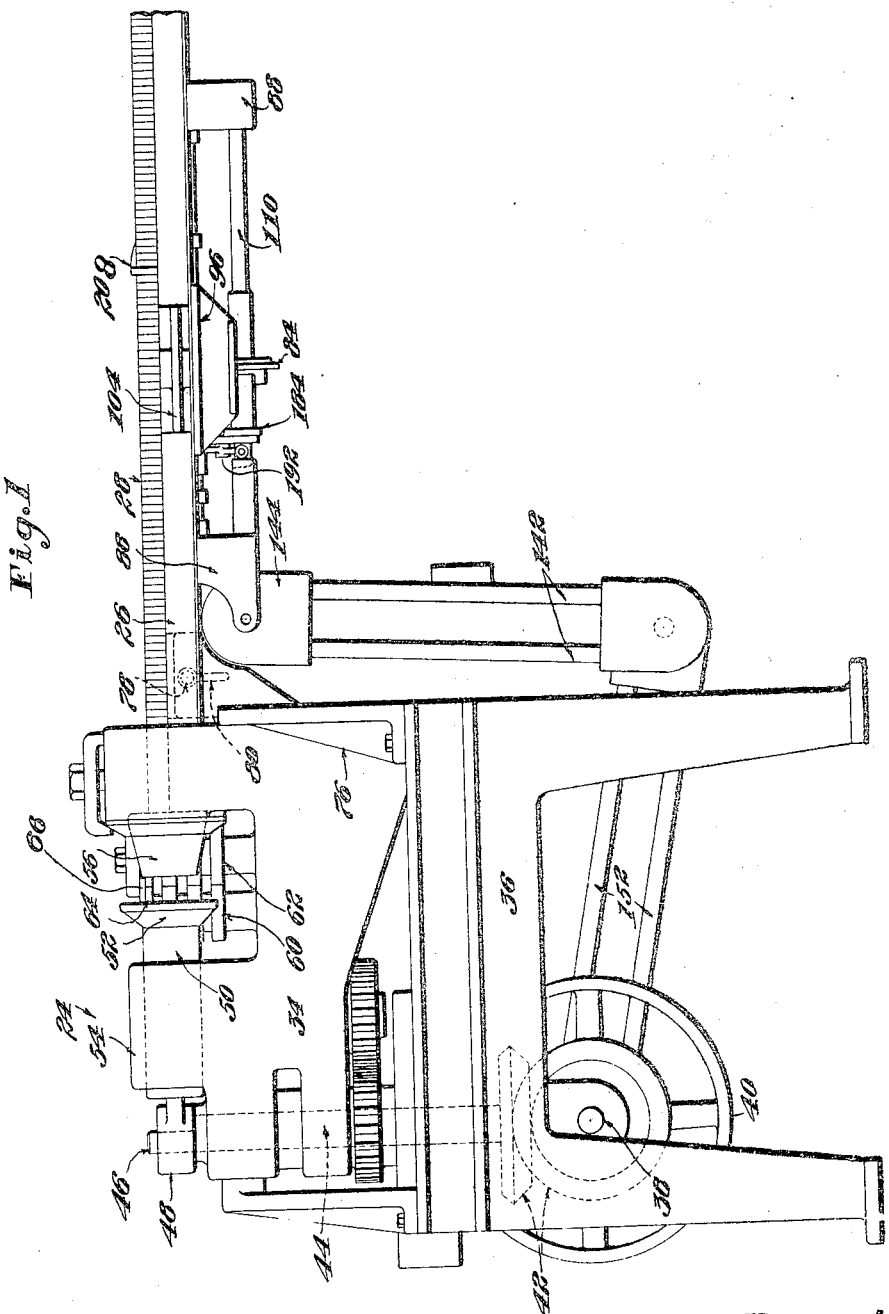

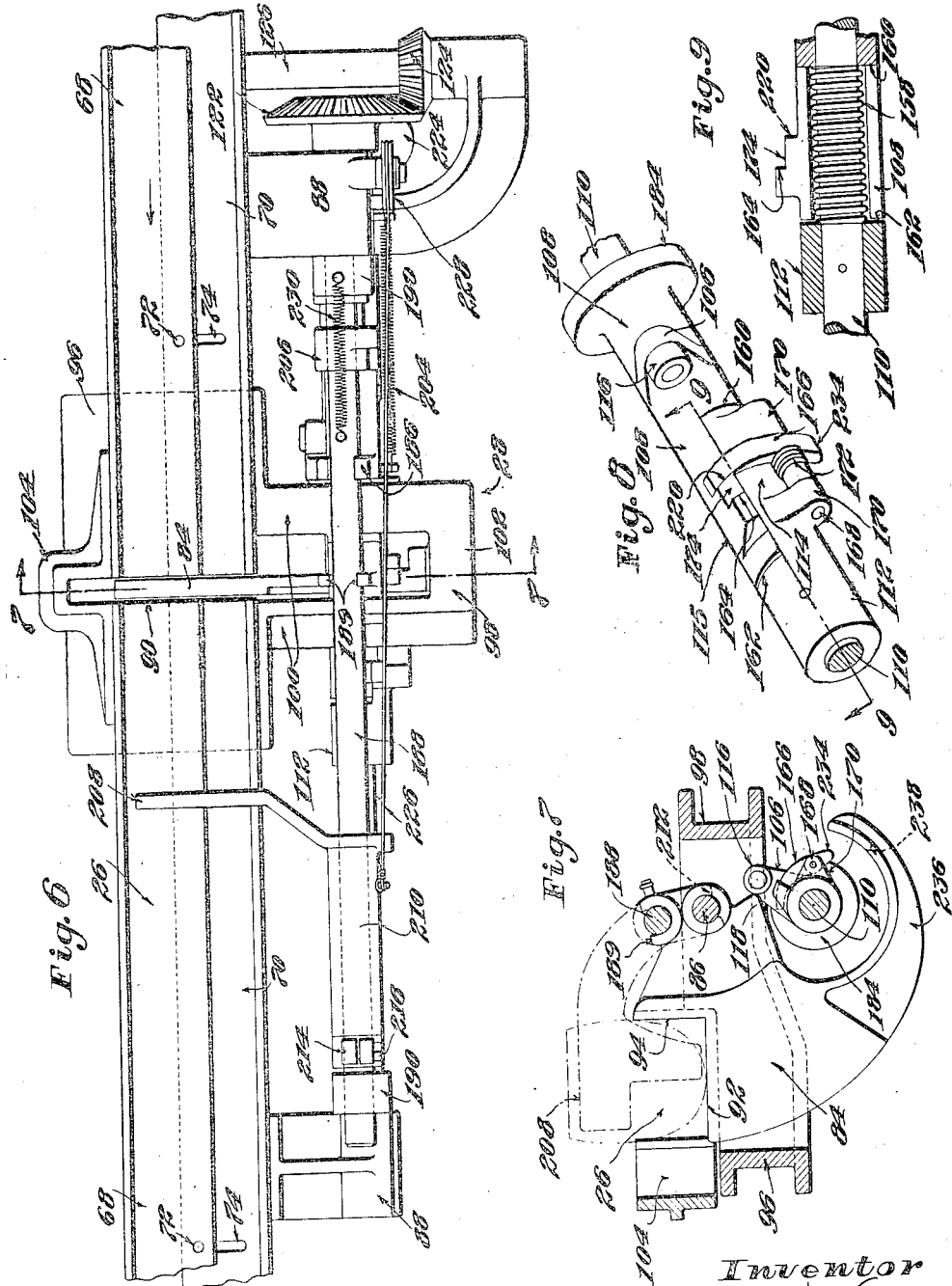

Patented Nov. 4, 1924.

1,513,779

UNITED STATES PATENT OFFICE.

ERASTUS E. WINKLEY, OF LYNN, MASSACHUSETTS, ASSIGNOR TO UNITED SHOE MACHINERY CORPORATION, OF PATERSON, NEW JERSEY, A CORPORATION OF NEW JERSEY.

STOCK-CUTTING MACHINE.

Original application filed May 26, 1920, Serial No. 384,320. Divided and this application filed June 8, 1921. Serial No. 475,995.

*To all whom it may concern:*

Be it known that I, ERASTUS E. WINKLEY, a citizen of the United States, residing at Lynn, in the county of Essex and State of Massachusetts, have invented certain Improvements in Stock-Cutting Machines, of which the following description, in connection with the accompanying drawings, is a specification, like reference characters on the drawings indicating like parts in the several figures.

This invention relates to stock-cutting and handling machines for operating upon sheet material and, more particularly, to machines for cutting shoe stock such, for example, as heel lifts.

In the commercial production of heel lifts suitable sheet material is successively fed between the cooperating cutting-block and die of any of the well known stock-cutting or "dinking" machines and the lifts produced by the cutting operations are delivered, usually by means of a trough or chute, to a suitable receiver into which they fall at random in helter-skelter relation. It has been found by actual experience, that in the practical operation in shoe factories, of machines of this general character, imperfect lifts are often cut at either or both ends of the stock, whereby one or two imperfect lifts are liable to be interposed between the perfect lifts at regular intervals throughout the length of the delivery chute. This result may be due to the operator's carelessness in making certain preliminary adjustments, to failure on the part of the operator to properly present pieces of stock to the feed mechanism of the machine, or to other causes. Whatever the cause may be, imperfect lifts are so often produced under ordinary manufacturing conditions, that it is customary, either to manually remove these imperfect lifts from the chute as they advance therethrough, or to remove them by a manual sorting process after the lifts have been deposited in the receiver. Furthermore, in order that automatic heel-building machines may be employed to build heels from the perfect lifts, it is necessary that the lifts be introduced in stack formation into the magazines of the machines. The removal of the imperfect lifts by either of the methods mentioned above and the subsequent manual assembling of the perfect lifts in stacked formation ready for use in heel-building machines are slow and laborious operations which increase the cost of manufacturing the heels.

One object of the present invention is to provide, in a stock-cutting machine, simple and reliable automatic mechanism for removing from the blanks produced by the cutting operations any imperfect blanks which may have been cut from the ends of the pieces of sheet material operated upon.

To this end, the blanks successively emerging from the cutting instrumentalities are supported and guided in stack formation, and a lift removing mechanism is provided, which is intermittently actuated as the stack advances, to remove therefrom at regular intervals a plurality of lifts. These intervals are so spaced that the lifts removed from the stack include such imperfect lifts as may have been cut from the ends of the pieces of stock operated upon.

Other objects of the invention and features of construction by which they are attained will be set forth hereinafter in connection with the following description of the preferred embodiment of the invention.

The present application constitutes a division of an application, Serial No. 384,320, filed May 26, 1920, by the present applicant and assigned to the United Shoe Machinery Corporation.

In the accompanying drawings illustrating the preferred form of the invention, Figure 1 is a view, in rear elevation, of the machine; Fig. 2 is a view, in front elevation and on an enlarged scale, showing the ejector mechanism for removing the imperfect blanks; Fig. 3 is a sectional view on the line 3—3 of Fig. 2; Fig. 4 is an enlarged sectional detail taken on the line 4—4 of Fig. 2; Fig. 5 is an enlarged detail view of one of the parts shown in Fig. 2; Fig. 6 is a top plan view, on an enlarged scale, of the ejector mechanism; Fig. 7 is a sectional view taken on the line 7—7 of Fig. 6; Fig. 8 is a perspective view of a portion of the ejector actuating mechanism; and Fig. 9 is a detail sectional view taken on the line 9—9 of Fig. 8.

In its illustrated embodiment the invention comprises, in general, a stock-cutting or "dinking" mechanism 24 (Fig. 1) for cutting lifts from sheets or strips of stock; a chute 26 for receiving the lifts as they emerge from the cutting mechanism and maintaining them in stack formation; and a lift removing mechanism 28 for removing the imperfect lifts from the stack in the chute 26.

The stock-cutting mechanism 24 is of the same general construction and has the same mode of operation as the machine illustrated, described and claimed in United States Letters Patent No. 1,291,726, granted January 21, 1919, to W. C. Baxter, and assigned to the United Shoe Machinery Corporation. In the present machine, however, this mechanism 24 is so mounted as to receive and feed sheet material in a vertical plane instead of in a horizontal plane as in the machine of said patent, and the cutting instrumentalities of the present machine are arranged to operate upon the material thus fed so that the lifts cut therefrom will be forced through the die in a horizontal direction. In order to enable the invention to be better understood, certain portions of the stock-cutting mechanism 24 will be briefly described in this application. For a full and complete description of the parts of said mechanism, not fully described herein, reference may be had to said patent.

The operating parts of the stock-cutting mechanism 24 are carried by a head 34 (Fig. 1) that is supported upon a standard 36. A horizontal power shaft 38 is journaled in bearings on the standard 36 and continuously driven by a belt pulley 40. The shaft 38 is connected through intermeshing bevel gears 42 with a vertical main shaft 44. Projecting from the top of the vertical shaft 44 is an eccentric pin 46 which serves to reciprocate a pitman 48 that is connected to a plunger 50 having at its inner end a suitable holder in which is mounted a cutting-block 52. The plunger 50 reciprocates horizontally in a bearing 54 at the top of the head 34, moving the cutting-block 52 into and out of cooperative cutting relation with a die 56 which is removably secured to a suitable die-carrier, the latter being clamped to the head 34. The die 56 is open at both ends so that the lifts cut thereby may progressively pass in stack formation through the die into the chute 26 which is connected with the die so that the die and the chute provide a continuous guideway for the lifts.

The material to be operated upon is fed to the cutting instrumentalities by means of a pair of transversely grooved feed rolls 60 and 62 which are secured upon vertical shafts and are yieldingly pressed toward each other and driven, as described in the patent above referred to, in order that they may cooperate to intermittently feed the material as it is introduced between them. As also described in said patent, means is provided whereby the length of feed may be adjusted in accordance with the size of the die employed so as to normally advance the stock at each feed movement a distance equal to the width of the die. A pair of cooperating cutting disks 64 and 66 are secured to the upper ends of the shafts which carry the feed rolls 60 and 62, respectively, for the purpose of separating the strip of material, from which the lifts are immediately to be died, from the sheet of stock as the cutting operation proceeds.

The chute 26, into which the lifts advance as they emerge from the die, is in the form of an open trough and is constructed of a pair of angle-iron strips 68 and 70 (Fig. 6) which extend in a substantially horizontal direction and are arranged with their webs disposed in horizontal and vertical planes, the horizontal webs overlapping to form the bottom of the chute and the vertical webs forming the opposite sides thereof. The horizontal webs of the strips 68 and 70 are secured together by means of bolts 72 which extend through transverse slots 74 in one of said webs, the slots permitting the strips 68 and 70 to be adjusted toward and from each other to accommodate lifts of different sizes. The chute 26 is supported at its receiving end in a bracket 76 (Figs. 1 and 2), rising from the standard 36, by means of a suitable clamping device 78 extending through a vertical slot 80 in said bracket which permit upward or downward adjustment of the receiving end of the chute to bring it into registry with dies of different sizes. The opposite or delivery end of the chute 26 rests upon a stationary portion of the loading mechanism 28. The die 56 is so arranged that the lifts are cut with their breast edges uppermost and accordingly the lifts advance through the chute 26 with their curved rear edges resting upon the floor thereof, as indicated by broken lines in Fig. 7. It is obvious, however, that by slightly modifying the machine, it could be arranged to cut the lifts in any desired position, without departing from the spirit of the invention.

If imperfect lifts are cut they will of course be forced through the die and into the chute 26 with the perfect lifts. In order that perfect lifts only shall be loaded into the receptacle 32, the lift removing mechanism 28 is provided for removing the imperfect lifts from the chute 26 before the stack, which is being progressively built up in the chute, reaches the delivery end thereof and passes into the field of operations of the loading mechanism 30. To this end the lift-removing mechanism 28 comprises an ejector 84 (Figs. 6 and 7) a portion of which normally forms a section of the floor of the chute and is suddenly swung upwardly as the imperfect lifts are advanced into position above it, so as to eject said lifts from the chute. Since imperfect lifts can be cut only at the ends of the sheets of stock and the sheets are all of the same length, such lifts if present in the chute 26, will be located only at regular intervals therein, these intervals being determined by the thickness of the stock and the number of lifts which may be cut in a row extending lengthwise of the sheet. Accordingly, the ejector 84 is actuated automatically, as will be hereinafter described, after each advance beyond the ejector of a section of the stack of sufficient length to contain a number of lifts which has been ascertained to be equal to the number of lifts which can be cut lengthwise of the sheet or strip of stock.

The ejector 84, as shown in Figs. 6 and 7, comprises a substantially flat wing-like member having an irregular marginal contour. The ejector is carried by a horizontal rock-shaft 86 that extends longitudinally in front of the chute 26, and is journaled in bearing brackets 88 projecting from the adjacent side wall of the chute. The ejector is disposed in a plane transverse to the rock-shaft 86 and the chute 26, and is adapted for vertical swinging movement through a narrow gap 90 in the chute. The upper portion of the ejector is provided with flat edge faces 92 and 94 (Fig. 7) which are disposed at right angles to each other. When the ejector is in its normal or lowermost position, these edge faces 92 and 94 form, respectively, sections of the floor and front side wall of the chute. In the construction shown, the width of the faces 92 and 94 of the ejector are substantially equal to the width of four lifts, so that four lifts will be removed from the chute at each operation of the ejector. This insures against failure of removing imperfect lifts due to slight inaccuracies of adjustment or irregularities of operation of the lift removing mechanism.

The chute 26 is supported on opposite sides of the gap 90 by means of the horizontal shelf-like portion 96 (Fig. 6) of a bracket 98 which is secured to the two sections of the angle-iron strip 70 and holds them in alinement. The bracket 98 is provided with a pair of horizontal arms 100 which extend forwardly on opposite sides of the ejector 84 and are apertured to permit the rock-shaft 86 to extend loosely therethrough. In front of the rock-shaft 86 the arms 100 are re-enforced by a connecting web 102. The two sections of the angle-iron strip 68, on opposite sides of the gap 90 are joined together in alinement with each other by means of a yoke-shaped connecting member 104.

The ejector 84 is swung upwardly by means of an actuator 106 (Figs. 2, 7 and 8). The actuator 106 comprises an arm projecting from a sleeve 108 which is mounted with provision for longitudinal sliding movement on a continuously rotating horizontal shaft 110 that is journaled in the bearing brackets 88 beneath the rock-shaft 86. The actuator sleeve 108 is connected to rotate with the shaft 110 by means of a coupling member 112 which is fixed to the shaft 110 adjacent the actuator sleeve. The coupling member 112 comprises a sleeve having a longitudinal projection 114 that is formed by cutting away the material at one side of the axial plane of the sleeve adjacent one end thereof. The actuator sleeve 108 is provided with a similar projection 115. As shown clearly in Fig. 8, the actuator sleeve 108 and the coupling member 112 are assembled on the shaft 110 with their respective projections 114 and 115 overlapping. This construction permits the sleeve 108 to be rotated with the shaft 110 and also to be capable of being shifted longitudinally on the shaft. The actuator arm 106 carries at its free end a roll 116 which normally travels idly at one side of the ejector 84 as the shaft 110 rotates. At pretermined intervals, however, the roll 116 is caused, by the longitudinal shifting of the actuator sleeve 108 on the shaft 110 to cooperatively engage a cam lug 118 (Fig. 7) rearwardly projecting from the ejector, so as to suddenly lift the ejector for the purpose of removing from the chute such lifts as may be located above the face 92.

The shaft 110 is continuously driven during the operation of the machine through intermeshing bevel gears 122 and 124, (Figs. 2 and 6) the former being secured to the shaft 110, and the latter to a transverse horizontal shaft 126 which is journaled in extensions of the bearing bracket 88. In order to permit vertical adjustment of the receiving end of the chute 26 in accordance with the size of the die employed in the cutting mechanism, the transverse shaft 126 is driven from the power shaft 38 by means of two sprocket chains 128 and 130 (Figs. 2 and 3). The sprocket chain 128 passes over a sprocket wheel 132 which is secured to the transverse shaft 126 and over a sprocket wheel 134 (Fig. 3), the latter being fast on one end of a shaft 136 that is journaled in a sleeve 138 integrally formed at one side of a sprocket wheel casing 140. The casing 140 is connected by means of two tubes 142, which enclose the parallel stretches of the chain 128, with a casing 144 which encloses the sprocket wheel 132 and is mounted to swing vertically on the shaft 126. The other sprocket chain 130 passes over a sprocket wheel 146 that is secured to the other end of the shaft 136, adjacent the outer end of the sleeve 138, and over another sprocket wheel 148 which is journaled in a sprocket wheel casing 150. The casing 150 is supported by means of a pair of tubes 152 which enclose the parallel stretches of the chain 130 and connect the chain 150 with a similar casing 154, the latter having a hub 156 (Fig. 3) which is journaled on the sleeve 138 of the casing 140. With this arrangement the transverse shaft 126 is permitted to move vertically with respect to the power shaft 38 as the elevation of the chute is adjusted, without interrupting the driving connections between said shafts.

Normally the ejector actuator 106 is positioned on the shaft 110 so that the roll 116 will not engage the cam lug 118 of the ejector 84 as said shaft rotates. To this end the actuator sleeve 108 is acted upon by a spring 158 (Fig. 9) which tends to move the sleeve 108 away from the coupling member 112. The spring 158 is coiled around the shaft 110 between opposed end faces 160 and 162 on the actuator sleeve 108 and coupling member 112 respectively, (see also Fig. 8) the projections 114 and 115 of said members having their inner faces cut away to provide space for the spring. Sliding movement of the actuator sleeve 108, under the influence of the spring 158, is normally limited by the engagement of a stop shoulder 164 on the projection 115 of the actuator sleeve with the side of a latch 166, the latter being pivoted on a pin 168 that is secured in lugs 170 projecting laterally from the projection 114 of the coupling member 112. A light coiled spring 172 presses the latch 166 inwardly against a face 174 on the projection 115, adjacent the shoulder 164, thus holding the side of the latch 166 in engagement with said shoulder.

In order that the actuator 106 may become operative to actuate the ejector, the roll 116 that is carried by the actuator must be brought into the vertical plane of the cam lug 118 on the ejector. To this end means is provided for shifting the sleeve 108, which carries the actuator arm 106, toward the coupling member 112, against the action of the spring 158. The means for shifting the sleeve 108 comprises a cam 178 and a shift-arm 180 (Figs. 2, 4 and 5). The cam 178 consists of a sleeve that is secured to the shaft 110 adjacent the bracket 88 and is provided with a cam face at the end remote from the bracket. The shift-arm 180 projects downwardly from a sleeve which is mounted for oscillatory and sliding movements on the rock-shaft 86 and is adapted to engage the outer side of an annular flange 184 that is formed at one end of the sleeve 108. The shift-arm 180 is normally maintained in a predetermined angular relation with respect to the shaft 110 by an upward extension 186 of said arm which is forked to embrace a horizontal guide-rod 188. The guide-rod 188 is supported at its opposite ends in a pair of brackets 190 (Fig. 2) which are secured to the rock-shaft 86 and the guide-rod is embraced by a forked portion 189 of the ejector 84.

In order that the shift-arm 180 may be moved laterally on the rock-shaft 86 in a direction to slide the ejector actuator 106 on the shaft 110, a finger 192 (Fig. 4) is pivoted by means of a stud 194 to one side of the arm 180 and carries at its lower end a cam roll 196 which is adapted to be engaged by the end face of the cam 178. To this end a spring 198 surrounds the stud 194 and tends to swing the cam roll 196 forwardly toward the shaft 110 and to hold it in operative position adjacent the face of the cam 178. An upwardly extending lug 200 on the finger 192 is adapted to engage a stop lug 202 on the shift-arm 180 to limit the movement of the finger 192, under the influence of the spring 198, and prevent the flat end face of the cam roll 196 from being pressed against the shaft 110.

Normally the shift-arm is held by means of a coiled spring 204 (Figs. 2 and 6) in such a longitudinal position on the rock-shaft 86 that the flat end face of the cam roll 196 engages the cylindrical surface of the cam 178 so that the shift-arm is unaffected by the rotation of the cam. Provision is made, however, for automatically sliding the shift-arm on the rock-shaft 86, against the tension of the spring 204, sufficiently to permit the finger 192 to be swung by its spring 198 into position to be engaged by the face of the cam 178. To this end the guide-rod 188 is adapted for longitudinal sliding movement in the supporting brackets 190 and a downwardly extending finger 206, (Figs. 2 and 6) is secured to said rod and forked at its lower end to straddle the rock-shaft 86, between the shift-arm and adjacent bracket 190. The finger 206 is moved laterally, in a direction to slide the shift-arm against the tension of the spring 204, by means of a device which measures the advance of the stack in the chute 26 after each actuation of the ejector, and when the stack has moved a predetermined distance, operates to slide the guide-rod 188 in the direction of movement of the stack.

The device for measuring the advance of the stack in the chute 26 comprises a measuring finger 208, (Figs. 2, 6 and 7) which projects laterally from a sleeve 210 that is free to slide on the guide-rod. The measuring finger 208 consists of a slender, irregularly shaped member curving upwardly and rearwardly from the sleeve 210 and having a flat extremity which is adapted to enter the space in the stack left by the removal of lifts by the preceding operation of the ejector. A lug 212 projecting from the under side of the sleeve 210 is forked at its lower extremity to straddle the rock-shaft 86 and serves to determine the angular position of the measuring finger with respect to the guide-rod. Normally as shown in Fig. 7, the measuring finger 208 extends transversely across the chute 26, in the path of the advancing lifts.

As the stack continues to advance in the chute 26, after the removal of a group of lifts by the ejector, the measuring finger 208 is advanced by the lifts behind it, the sleeve 210 sliding on the guide-rod 188. Just before the stack which is building up between the measuring finger and the gap 90 in the chute has increased sufficiently to contain the required number of lifts, the sleeve 210 engages a split collar 214 (Figs. 2 and 6) which is clamped by means of a bolt 216 to the guide-rod 188. Continued sliding movement of the sleeve 210 causes the guide-rod 188 to slide longitudinally in the bracket 190. The sliding movement of the guide-rod 188 will be transmitted to the shift-arm 180 by means of the forked finger 206 which is secured to said rod and straddles the rock-shaft adjacent the shift-arm. As the lateral movement of the shift-arm 180 moves the cam roll 196 beyond the face of the cam 178, the spring 198 forces the finger 192 forwardly so that the roll 196 is engaged by the face of the cam. Rotation of the cam 178 then moves the shift-arm 180 into contact with the adjacent side of the annular flange 184 at the end of the actuator sleeve 108, thus shifting the roll 116 into the vertical plane of the cam lug 118 on the ejector.

The actuator 106 is temporarily locked in operative position by means of the latch 166 which snaps behind a shoulder 220 on the actuator sleeve 108 as shown in Fig. 8. As the roll 116 on the actuator 106 strikes the cam lug 118, the ejector 84 is suddenly raised and the lifts, which are located directly above it in the chute 26, are ejected from the chute and fall to one side thereof where they may be collected in a suitable receptacle.

As the shaft is rocked to raise the ejector, the guide-rod 188 which is mounted in the brackets 190, is swung laterally about the axis of the rock-shaft, so that the measuring finger 208 is raised in unison with the ejector. The measuring finger moves upwardly until clear of the stack, whereupon it is restored to its normal longitudinal position with respect to the guide-rod 188 and into alinement with the ejector 84, by means of a weight 224 (Fig. 2) which is connected with the sleeve 210 by means of a cord 226 that passes over a pulley 228 on the bracket 88. As the measuring finger, after being withdrawn from the stack, moves toward the ejector under the influence of the weight 224, the guide-rod 188 is returned to its normal position, with the finger 206 in engagement with the adjacent bracket 190, by means of a spring 230, one end of which is secured to the guide-rod and the opposite end to the bracket 190.

The movement of the guide-rod 188, as it swings forwardly about the axis of the shaft 86, is communicated to the shift-arm 180 through the upward extension 186 of the latter, the shift-arm being swung rearwardly and the cam roll 196 withdrawn from engagement with the face of the cam 178. The spring 204 then retracts the shift-arm, toward the right in Fig. 2, into normal position on the rock-shaft, the movement of the shift-arm being limited by means of the finger 206.

After the actuator roll 116 reaches the point of the cam lug 118 the ejector descends by gravity and the measuring finger follows it into space occupied by the ejected lifts. The return of the ejector turns the rock-shaft 86 in a counter-clockwise direction, viewing Fig. 7, thus swinging the shift-arm forwardly. As the cam roll 196 is brought into engagement with the cylindrical surface of the cam 178, the spring 198 permits the shift-arm to continue its radial movement until restored to normal position.

The actuator 106 is restored to its normal longitudinal position on the shaft 110 before the ejector is returned to its normal position. For this purpose the latch 166 is provided with a tail 234 which is adapted to be engaged by the under side of the bracket 96 so that the latch is swung outwardly beyond the shoulder 220, thus permitting the spring 158 to shift the actuator sleeve 108 until the roll 116 is removed from the vertical plane of the cam lug on the ejector.

In order to insure that the ejector will be returned to normal position with the face 92 flush with the upper surface of the floor of the chute so as to offer no obstruction to the advance of the lifts through the chute, the ejector is provided with a curved depending extension 236 having at its free end a lateral offset which projects into the path of movement of the actuator roll 116 after the actuator has been restored to normal position on the shaft 110. If the ejector has not been completely returned by gravity by the time the actuator roll 116 reaches the lug 238 the roll will engage the lug and positively return the ejector and the measuring finger to their normal positions.

It will be seen that by measuring the length of the section of the stack which is permitted to advance beyond the ejector between successive operations of the latter, the ejector is caused to remove lifts at regular intervals throughout the stack. The length of said sections is determined by the location of the collar 216 on the guide-rod 188, and the collar is adjusted to render the ejector actuator operative when said section has increased in length sufficiently to contain the number of lifts which the strips of stock being operated upon are capable of producing. If the size of the die employed in the cutting mechanism is materially changed, of course a different number of lifts will be cut from the strips and the spacing of the intervals separating the imperfect lifts in the stack will of course vary accordingly. By loosening the bolt 216 and adjusting the collar 214 on the guide-rod 188, however, the space through which the measuring finger is permitted to move before the actuator 106 is rendered operative may be varied.

The lifts removed by the successive operations of the ejector, and which, as before mentioned may be collected in a suitable receptacle will, of course, include some perfect lifts. These perfect lifts may be separated from the others by a sorting process and saved. Inasmuch as the quantity of lifts which will require assorting is very small in comparison with the entire quantity of lifts produced, the time required for the sorting process will be proportionally less than that which would be required for sorting all the lifts.

It is to be understood, that the invention is not limited to the removal by the ejector, of more than a single lift, since by accurately adjusting the lift removing mechanism, practical results might be obtained with an ejector so constructed that only as many lifts will be removed at each ejecting operation as are capable of being produced between the groups of perfect lifts.

While it is preferred to employ the specific construction and arrangement of parts shown and described, it will be understood that this construction and arrangement is not essential except so far as specified in the claims, and may be changed or modified without departing from the broader features of the invention.

The invention having been described, that which is claimed as new is:—

1. The combination with means for cutting pieces from strips of stock and delivering the pieces in stack formation, of means for receiving the pieces so stacked, and means for removing from the stack the imperfect pieces cut at the ends of the strips.

2. The combination with means for cutting pieces from strips of stock and delivering the pieces in stack formation, of means for receiving the pieces so stacked, and means for simultaneously removing from the stack the pieces cut from the rear and front ends respectively of successively presented strips.

3. The combination with means for cutting pieces from strips of stock and progressively stacking the cut pieces, of a receiver for the pieces so stacked including imperfect pieces cut at the ends of the strips, and means for removing said imperfect pieces from the receiver.

4. The combination with means for cutting pieces from strips of stock and progressively stacking the cut pieces, of means for receiving the pieces so stacked, and means for removing pieces from the stack at intervals so spaced that the pieces removed will comprise the pieces cut from the ends of the strips.

5. The combination with means for cutting pieces and progressively stacking the cut pieces, of a chute for receiving the pieces so stacked including imperfect pieces cut at the ends of the strips, and an ejector movable transversely of the chute and adapted to be actuated to eject said imperfect pieces therefrom.

6. The combination with means for cutting pieces from strips of stock, of a chute for receiving and guiding the cut pieces emerging from the machine including imperfect pieces cut at the ends of the strips, and mechanism controlled by the advance of the pieces through the chute for removing the imperfect pieces.

7. The combination with means for cutting pieces from strips of stock, of a chute for receiving and guiding the cut pieces including imperfect pieces cut at the ends of the strips, and an intermittently operating ejector for removing a plurality of pieces from the stack at intervals so spaced that said imperfect pieces will be included among those removed.

8. The combination with means for cutting pieces from strips of stock, of a chute through which the cut pieces are advanced in progressively stacked formation, a normally inoperative ejector for removing from the stack the pieces cut from the ends of successively presented strips, and means for actuating the ejector when said end pieces have been brought into its field of operation.

9. The combination with means for cutting pieces from strips of stock and progressively stacking and advancing the cut pieces, of a chute for receiving the pieces so stacked, a normally inoperative ejector for removing pieces from the stack at regular intervals as the stack is advanced, and means for measuring the advance of the stack and controlling the operation of the ejector in accordance therewith.

10. The combination with means for cutting pieces from strips of stock and progressively stacking and advancing the cut pieces, of a chute for receiving the pieces so stacked, a normally inoperative ejector for removing pieces from the stack at regular intervals as the stack is advanced, a measuring device for rendering the ejector operative upon the advance of the stack through a predetermined distance, and means for adjusting said measuring device to vary the amount of advance of the stack required to render the ejector operative.

11. The combination with means for advancing a stack of blanks, of means for periodically ejecting a predetermined number of blanks from the stack at a point intermediate between the ends thereof and at spaced intervals during the advance of the stack.

12. The combination with a hollow die and a cooperating cutting-block for cutting blanks from strips of stock and advancing the blanks in stack formation, of a chute forming an extension of the die for receiving the stacked blanks, and means for periodically removing from the stack at spaced intervals a plurality of blanks.

13. A machine for operating on sheet material having, in combination, means for cutting blanks from said material and stacking said blanks, means for supporting said stack while it is fed forward by the continued addition of blanks thereto, a blank ejector adjacent to the stack, and means for actuating said ejector to eject one or more blanks from the stack controlled by the advance of a predetermined number of blanks past the ejector.

14. A machine for operating on sheet material having, in combination, means for cutting blanks from said material and stacking said blanks; means for supporting said stack while it is fed forward by the continued addition of blanks thereto; a blank ejector adjacent to the stack; a normally inactive actuator for said ejector; a measuring device movable with the advancing stack; and means for operating said ejector actuator controlled by a predetermined advance of said device beyond the ejector.

15. A machine for operating on sheet material having, in combination, means for cutting blanks from said material and stacking said blanks; means for supporting said stack while it is fed forward by the continued addition of blanks thereto, a blank ejector adjacent to the stack; and means for operating said ejector periodically to eject one or more blanks from the stack including a measuring finger arranged to enter the space previously occupied by said ejected blanks after each ejecting operation and be moved beyond said ejector by the advancing stack, and an ejector actuating mechanism the operation of which is controlled by a predetermined advance of said finger.

16. A machine for operating on sheet material having, in combination, means for cutting blanks from said material and stacking said blanks; means for supporting said stack while it is fed forward by the continued addition of blanks thereto; a blank ejector adjacent to the stack; means for operating said ejector periodically to eject one or more blanks from the stack including a measuring finger arranged to enter the space formerly occupied by said ejected blanks after each ejecting operation and be moved beyond said ejector by the advancing stack, and an ejector actuating mechanism the operation of which is controlled by a predetermined advance of said finger; and means for replacing the finger after each measuring operation in position to enter the space formed by the ejected blanks.

17. A machine for operating on sheet material having, in combination, means for cutting and stacking blanks from said material, means for supporting said stack, and means operating periodically in timed relation to the blank cutting operations to eject one or more blanks from the stack at predetermined intervals.

18. In a machine for cutting blanks from sheet material of the type which produces groups of perfect and imperfect blanks successively and progressively stacks both perfect and imperfect blanks in the order in which they are produced, a blank ejector past which the stack is fed by the addition of blanks thereto, and means for actuating said ejector periodically as each group of imperfect blanks is fed within its field of operation.

19. In a machine for cutting blanks from sheet material of the type which produces groups of perfect and imperfect blanks successively and progressively stacks both perfect and imperfect blanks in the order in which they are produced, a blank ejector past which the stack is fed by the addition of blanks thereto, and means controlled by the advance of the groups of imperfect blanks for actuating said ejector when said groups successively come within its field of operation.

20. In a machine of the type in which blanks are successively cut by a die and fed therefrom in stack formation, a chute for receiving said stack having a transverse slot in one portion thereof, a blank ejecting device arranged to operate in said slot, and means for periodically operating said ejecting device.

21. In a machine of the character described, a support for a stack of blanks, means for moving the stack of blanks along the support toward a discharge station, and means for ejecting imperfect blanks from the stack at a point intermediate between the ends of the stack.

22. In a machine of the character described, a support for a stack of blanks, means for moving the stack along the support, a blank ejector mounted adjacent to the support, means for actuating the ejector to eject blanks from an intermediate portion of the stack at intervals, and a member operated by the advancing stack of blanks for controlling said means.

23. In a machine of the character described, means for forming blanks and progressing them in stacked formation along a support, and an ejector movable transversely of the stack for moving blanks at predetermined intervals from parts of the stack intermediate between the ends thereof.

24. In a machine of the character described, a support for a stack of blanks, means for moving the stack along the support, a blank ejector mounted adjacent to the support, and means for actuating the ejector at regular intervals to eject blanks from an intermediate portion of the stack.

25. In a cutting machine, means for cutting pieces from strips of stock of known length and thickness and delivering the pieces in stack formation, a support over which the stack is moved, an ejector for removing pieces from the stack at a point intermediate between its ends, and means for operating the ejector automatically after each advance beyond the ejector of a section of the stack sufficient to contain the pieces cut from a strip of known length and thickness.

26. In a machine of the class described, a chute along which a stack of blanks may be fed, a pusher for moving the blanks along the chute, a normally inoperative ejector for removing blanks from the stack at intervals as the stack is advanced, a measuring device movable with the stack of blanks, and connections between the measuring device and the ejector for rendering the ejector operative upon advance of the stack through a measured distance.

27. In a machine of the character described, a support along which a stack of blanks may be fed, a blank ejector adjacent to the support, means for operating the ejector, a measuring finger arranged to enter the space previously occupied by blanks which have just been ejected, the arrangement being such that the measuring finger moves along with the advancing stack of blanks, and connections between the measuring finger and the ejector operating means for controlling the latter upon a predetermined advance of the said finger.

In testimony whereof I have signed my name to this specification.

ERASTUS E. WINKLEY.